United States Patent [19]
Lin

[11] Patent Number: 5,346,521
[45] Date of Patent: Sep. 13, 1994

[54] APPARATUS AND METHOD FOR FABRICATING OPTICAL FIBER COUPLER

[75] Inventor: Song-Fure Lin, Hsinchu, Taiwan

[73] Assignee: Industrial Technology Research Institute, Taiwan

[21] Appl. No.: 683,963

[22] Filed: Apr. 11, 1991

[51] Int. Cl.⁵ ............................................. C03B 23/04
[52] U.S. Cl. ........................................ 65/407; 65/152; 65/162; 65/485; 65/486; 65/29.12
[58] Field of Search .................... 65/4.2, 4.21, 4.3, 29, 65/152, 158, 162

[56] References Cited

U.S. PATENT DOCUMENTS

| | | | |
|---|---|---|---|
| 4,591,372 | 5/1986 | Bricheno et al. | 65/4.2 |
| 4,763,272 | 8/1988 | McLandrich | 65/4.2 X |
| 4,765,816 | 8/1988 | Bjornlie et al. | 65/4.2 |
| 4,931,076 | 6/1990 | Berkey | 65/4.2 |
| 4,979,972 | 12/1990 | Berkey et al. | 65/4.2 |

*Primary Examiner*—Robert L. Lindsay
*Attorney, Agent, or Firm*—Darby & Darby

[57] ABSTRACT

An apparatus for fabricating an optical fiber coupler having a well-controlled quality and an improved packaged strength is provided. The apparatus includes a holding device holding thereon a quartz tube sleeving therein an optical fiber strand having a spliced portion to be fused, two pulling stages oppositely pulling the fiber strand, a heating device having two torch blowpipes for heating through the quartz tube the spliced portion, a first driving mechanism for oppositely translating the pulling stages, a second driving mechanism for reciprocatingly translating the blowpipes along the quartz tube, and a programmable controller coupled to and for controlling the heating device, the first and the second driving mechanisms. A method for fabricating the optical fiber coupler is also disclosed.

7 Claims, 3 Drawing Sheets

APPARATUS AND METHOD FOR FABRICATING OPTICAL FIBER COUPLER

BACKGROUND OF THE INVENTION

The present invention relates to an optical fiber coupler, and more particularly to an apparatus and method for fabricating the same.

Generally speaking, there are three methods for fabricating an optical fiber coupler at present, namely, the etching method, the polishing method and the fusing method. The latter is the most popular method but still suffers from the following disadvantages:

1. The torch adapted to heat the optical fiber strand is held immovable which makes the fusing zone relatively small and thus makes coupling of the optical fiber strand difficult.

2. Upon heating, the optical fiber strand is pulled simultaneously by a single pulling stage at its one end. Consequently, the spliced portion intends to be fused will keep on moving toward the pulling direction which results in an uneven fusing and increases the optical loss of the produced optical fiber coupler.

3. Since the spliced portion is directly heated by an immovable torch, it cannot be entirely evenly heated.

4. The fused optical fiber strand having a relatively fragile fused zone is directly packaged which increases the possibility of breakage of the optical fiber coupler during packaging and thus reduces the yield of the produced optical fiber coupler.

SUMMARY OF THE INVENTION

It is therefore an object of the present invention to provide an apparatus and method for fabricating an optical fiber coupler having a well-controlled quality and improved strength.

It is further an object of the present invention to provide an optical fiber coupler having well-controlled quality and improved strength.

According to the first aspect of the present invention an apparatus for fabricating an optical fiber coupler including an optical fiber strand having at least two segments of optical fibers which are spliced near their centers to form a spliced portion adapted to be sleeved in a quartz tube for being fused, comprises: a holding device capable of holding thereon the quartz tube; two pulling stages respectively disposed on two opposite sides of the holding device for respectively clipping two ends of the fiber strand for oppositely pulling the fiber strand according to a predetermined pulling mode; a heating device including at least a torch blowpipe for indirectly heating the spliced portion through the quartz tube, and a torch holder for holding thereon the torch blowpipe; a first driving mechanism for moving the two pulling stages toward opposite directions; a second driving mechanism for reciprocatingly moving the torch holder to enable the torch blowpipe to reciprocatingly translate along the axial direction of the quartz tube; and a programmable controller coupled to and for controlling the heating device, the first driving mechanism and the second driving mechanism.

According to the second aspect of the present invention, a method for fabricating an optical fiber coupler comprises: preparing an optical fiber strand having at least two segments of optical fibers, and a quartz tube having a length smaller than that of the fiber strand; removing coatings on two ends of each of the optical fibers; removing coatings on central portions of the optical fibers to be fused; securing one end of the fiber strand to a first pulling stage and passing the fiber strand through the quartz tube; splicing the central portions to be fused to form a spliced portion; securing the other end of the fiber strand to a second pulling stage and clipping the quartz tube on a holding device; providing a heating device having at least one torch blowpipe capable of indirectly heating the spliced portion through the quartz tube; coupling an optical source to the one end and connecting the the other end to an optical detector; igniting the torch blowpipe, reciprocatingly moving the torch blowpipe along the quartz tube, and moving the first and second pulling stages in a mirror-image symmetrical manner for oppositely pulling the fiber strand at its two ends; interrupting heating of the at least one torch blowpipe when a desired output ratio of the optical fibers is detected by the detector; and filling an adhesive through two ends of the quartz tube for adhesively incorporate the fiber strand with the quartz tube. Preferably, a programmable controller is further provided for programmably controlling how the first and second pulling stages are moved, how the at least one torch blowpipe is reciprocatingly moved and how high the temperature of the at least one torch blowpipe is.

BRIEF DESCRIPTION OF THE DRAWING

The present invention may best be understood through the following description with reference to the accompanying drawings, in which.

DETAILED DESCRIPTION OF THE PREFERRED EMBODIMENT

Figure 1:
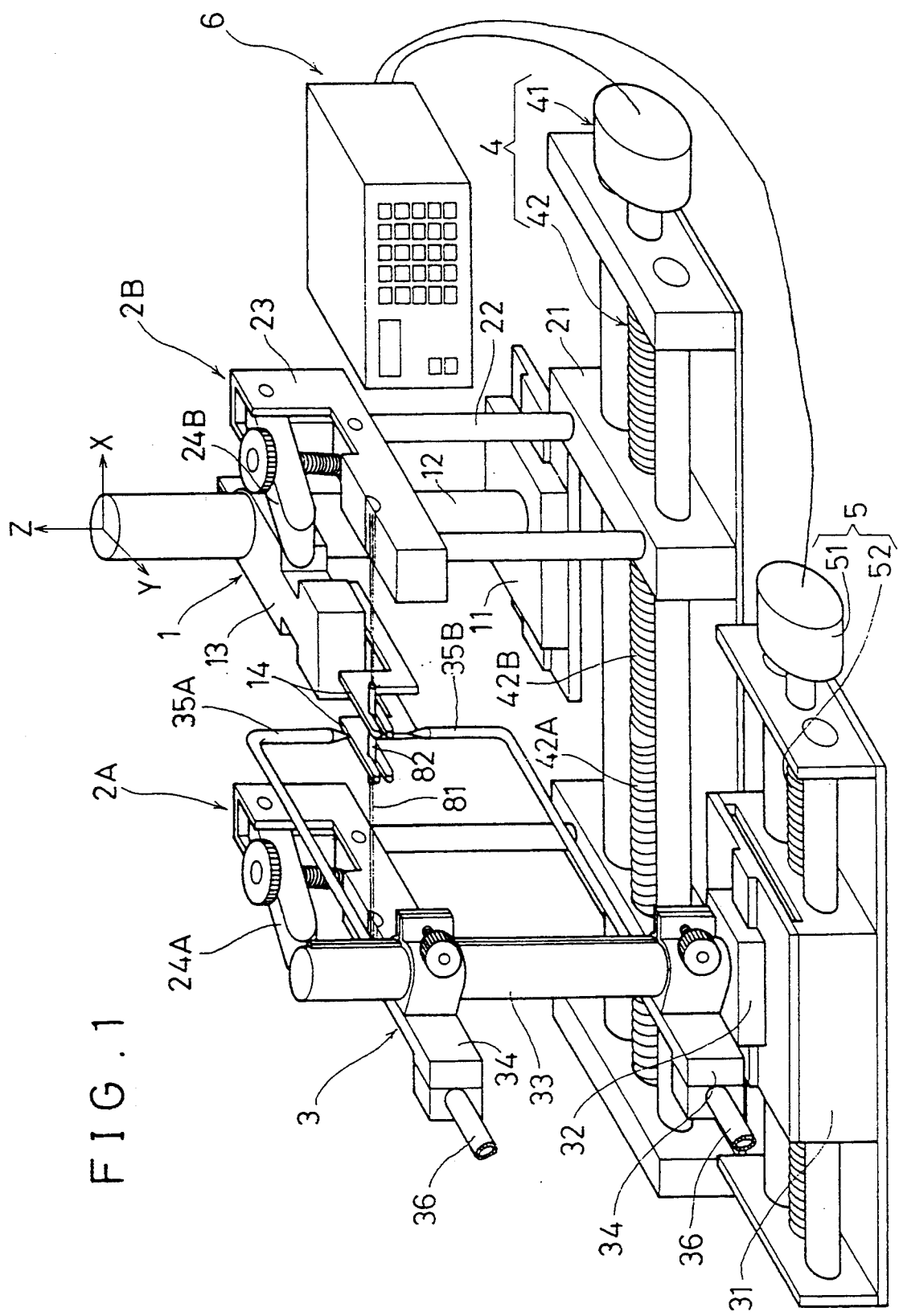
FIG. 1 is a perspective view showing a preferred embodiment of an apparatus for fabricating an optical fiber coupler according to the present invention.
Figure 2:
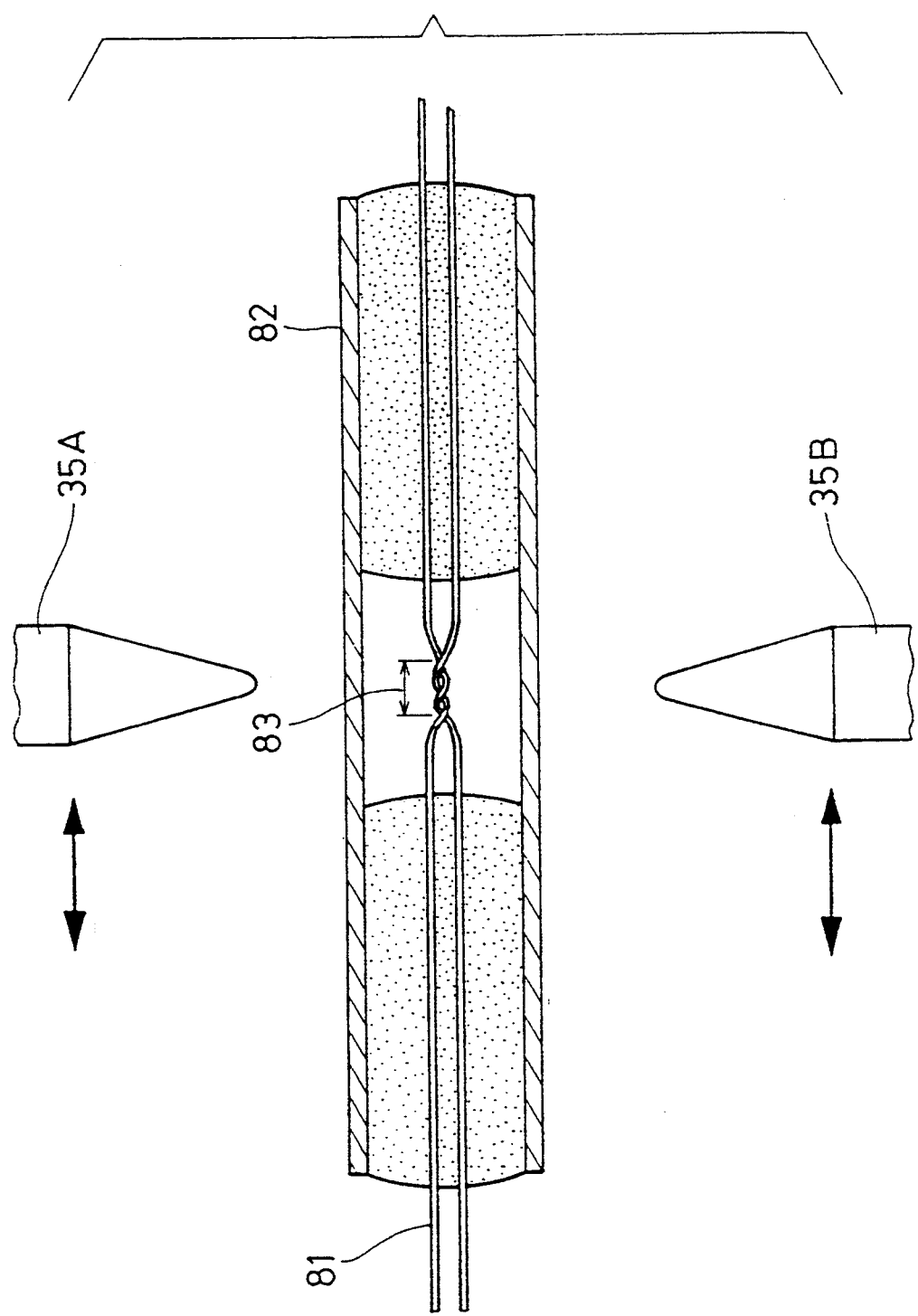
FIG. 2 is a schematical view showing how a heating device in the fabricating apparatus in FIG. 1 is heating a spliced portion of an optical fiber strand.
Figure 3:
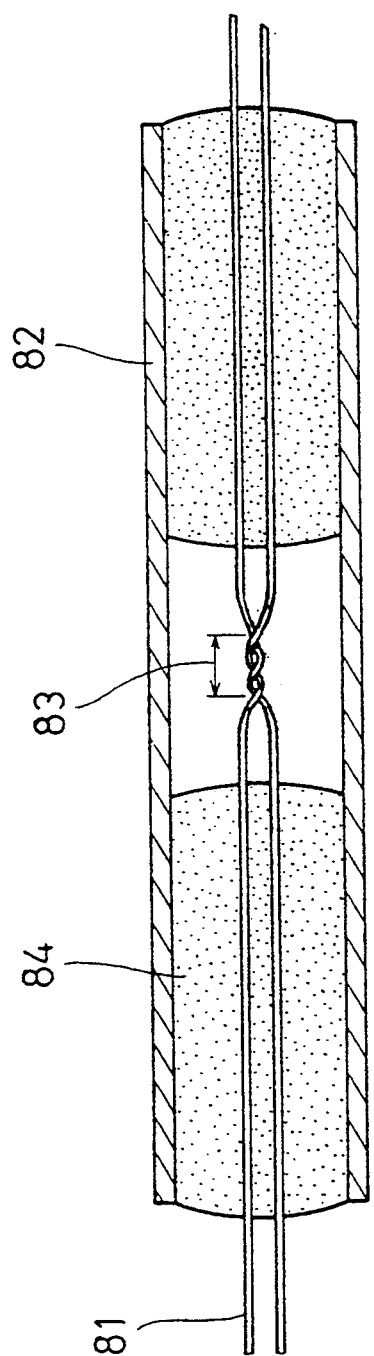
FIG. 3 is a sectional view showing an optical fiber coupler fabricated by the fabricating apparatus shown in FIG. 1.

Referring now to FIGS. 1–3, an apparatus for fabricating an optical fiber coupler according to the present invention includes a holding device 1 (to which an orthogonal coordinate system having X, Y and Z axes is attached to facilitate the below description) for holding thereon a quartz tube 82 sleeving therein an optical fiber strand 81 to be fused, two pulling stages 2A, 2B respectively disposed at two sides of device 1 for oppositely pulling two ends of strand 81 while fusing strand 81, a heating device 3 for fusing the spliced portion of strand 81, a first driving mechanism 4 for oppositely translating pulling stages 2A, 2B, a second driving mechanism 5 for reciprocatingly translating heating device 3 in the axial direction (X direction) of quartz tube 82 for indirectly heating through quartz tube 82 the spliced portion 83 of strand 81 to be fused, and a programmable controller 6 coupled to heating device 3, first driving mechanism 4 and second driving mechanism 5, so as to controll their functions.

Holding device 1 includes a horizontal slider 11 capable of being moved in the X direction, a vertical guide 12 mounted on slider 11, a securing member 13 supported on guide 12 in a vertically slidable (in Z direction) manner, and a pair of tube clips 14 secured to securing manner 13 for clipping quartz tube 82. By means of the holding device 1, the quartz tube 82 is held in a horizontally and vertically adjustable manner, being thus positionally vertically and horizontally adjustable.

First driving mechanism 4 includes a stepping motor 41 electrically coupled to controller 6 for setting the rotating direction and rotating speed of the stepping motor 41 as functions of time, and a bidirectional screw 42 driven by motor 41. Screw 42 comprises a right-handed threaded portion 42A and a left-handed threaded portion 42B having the same lead and respectively threadedly connected to pulling stages 2A, 2B. Second driving mechanism 5 includes a stepping motor 51 electrically coupled to programmable controller 6 for setting a bidirectionally operating mode, and a screw 52 driven by motor 51.

Each pulling stage 2A (2B) includes a horizontal slider 21 threadedly engaged to threaded portion 42A (42B) to be slidable in the X direction or the contrary direction, two vertical rods 22 mounted on slider 21, a securing seat 23 mounted on vertical rods 22, and a gripping device 24A (24B) for gripping one of two ends of strand 81 so that when pulling stages 2A, 2B oppositely pull strand 81, spliced portion 83 is centrally kept stationary.

Heating device 3 includes a horizontal slider 31 threadedly engaged with screw 52 to be movable in the X direction, a fine adjusting member 32 capable of sliding on slider 31 in X direction, a vertical rod 33 mounted of fine adjusting member 32, two torch holders 34 respectively holding two oxyhydrogen torch blowpipes 35A, 35B diametrically oppositely disposed around quartz tube 82, and two supplying pipelines 36 for, respectively, feeding therethrough oxygen and hydrogen to blowpipes 35A, 35B.

As described above, the programmable controller 6 is coupled to pulling stages 2A, 2B, heating device 3, first driving mechanism 4 and second driving mechanism 5.

A method for fabricating, for example, a 2×2 bidirectional optical fiber coupler according to the present invention is illustrated as follows. First, prepare two segments of optical fibers 81 of, for example, about 1 meter in length and a quartz tube 82, strip coatings on two ends of optical fibers 81 and coatings on intermediate portions of fibers 81 to be fused, clean the stripped portions to be fused with alcohol, fix one end of fiber strand 81 to pulling stage 2A and pass the other end of strand 81 through quartz tube 82, splice the stripped intermediate portions to be fused to form a spliced portion 83 (see also FIG. 2), fix the other strand end to pulling stage 2B, hold quartz tube 82 by means of tube clips 14, adjust the position of securing member 13 and thus the position of quartz tube 82 so as to locate the spliced portion 83 of the optical fiber 81 in the middle portion of the quartz tube 82, adjust heating device 3 to direct blowpipes 35A, 35B toward the middle portion of spliced portion 83, connect one end of optical fiber strand 81 to an optical source (not shown) and connect the other end of optical fiber strand 81 to an optical detector (not shown), maximize the optical input to the one end of optical fiber strand 81, input operating programs, including the data for the operating modes of pulling stages 2A, 2B and of blowpipes 35A, 35B, to programmable controller 6, supply oxygen and hydrogen through pipelines 36 to blowpipes 35A, 35B and ignite blowpipes 35A, 35B, and then run the operating programs under the control of programmable controller 6. The controller 6 determines the operating mode for pulling stages 2A, 2B, i.e. the pulling speed as a function of time at which the optical fiber strand 81, when heated by heating device 3, is to be pulled by pulling stages 2A, 2B, and the operating mode of heating device 3 including the oxyhydrogen flame temperature, the reciprocating stroke and the translating speed of blowpipes 35A, 35B so that the reciprocating blowpipes 35A, 35B will indirectly heat spliced portion 83 through quartz tube 82 when optical fiber strand 81 is simultaneously oppositely pulled at the two ends thereof. When it is detected that the optical output ratio of two fibers 81 has reached the desired value which means that fibers 81 have been properly fused, blowpipes 35A, 35B are closed and controller 6 is stopped. Then, an appropriate adhesive 84 is filled through the two ends of quartz tube 82 into the gap between the wall of the quartz tube 82 and the unfused portion of the strand 81 so as to form, after the adhesive 84 has solidified, a structurally integral optical fiber coupler as shown in FIG. 3 in order to prevent the relatively brittle spliced or fused portion 83 from being broken due to a vibration upon handling. After adhesive 84 has solidified, the combined strand 81 and quartz tube 82 is detached from clips 14 to be packaged.

Since heating device 3 indirectly heats the spliced portion 32 through tube 82 by reciprocatingly moving along quartz tube 82 which has a good heat-dissipating capability, the fused zone 83 will be uniformly heated. Through programmable controller 6, the reciprocating range of heating device 3 can be changed to adjust the coupling length of the optical fiber coupler according to the material of the optical fibers 81 being used. Since strand 81 is symmetrically pulled toward opposite directions at its two ends by pulling stages 2A, 2B, the middle part of spliced portion 83 to be fused is kept stationary which assures a stable fusing operation and thus a well-fused optical fiber strand. Since, in the thus obtained product, strand 81 is structurally integrally secured to quartz tube 82, the relatively brittle fused zone 83 is well protected by the quartz tube so that upon detaching from clips 14 and packaging, fused portion 83 will not easily be broken or damaged, thus the reject rate of the fabricated optical fiber coupler is greatly reduced.

In conclusion, compared with prior art, the present method and apparatus for fabricating an optical fiber coupler is uncontestedly advantageous. The above described embodiments for the present invention are not limitative but illustrative. For example, the number of blowpipes 35A, 35B can be more than two and the blowpipes 35A, 35B need not be oxyhydrogen torch blowpipes. Any modifications and changes made to the above embodiments cannot easily depart from the spirit and the scope of the present invention defined in the appended claims.

What I claim is:

1. An apparatus for fabricating an optical fiber coupler including an optical fiber strand having at least two segments of optical fibers which are spliced near their centers to form a spliced portion adapted to be sleeved in a quartz tube for being fused, comprising:

a holding device capable of holding thereon said quartz tube;

two pulling stages respectively disposed on two opposite sides of said holding device for respectively clipping two ends of said fiber strand for oppositely pulling said fiber strand according to a predetermined pulling mode, said pulling stages positioned such that said quartz tube will remain stationary on said holding device while said fiber strands are pulled;

a heating device including at least a torch blowpipe for indirectly heating said spliced portion through said quartz tube, and a torch holder for holding thereon said torch blowpipe;

a first driving mechanism for moving said two pulling stages toward opposite directions;

a second driving mechanism for reciprocatingly moving said torch holder to enable said torch blowpipe to reciprocatingly translate along the axial direction of said quartz tube; and a programmable controller coupled to and for controlling said heating device, said first driving mechanism and said second driving mechanism.

2. An apparatus according to claim 1 wherein said holding device is vertically and horizontally adjustable.

3. An apparatus according to claim 1 wherein said at least one torch blowpipe includes two or more torch blowpipes equally-spacedly arranged around said quartz tube.

4. An apparatus according to claim 1 wherein said first driving mechanism includes:

a stepping motor electrically connected to said programmable controller; and a screw driven by said stepping motor and having a right-handed and a left-handed threaded portions which have the same lead and are respectively threadedly connected to said two pulling stages thus capable of moving said two pulling stages with respect to said spliced portion in a mirror-image symmetrical manner.

5. An apparatus according to claim 1 wherein said second driving mechanism includes a stepping motor electrically connected to said programmable controller and mechanically connected to said torch holder for periodically reciprocate said torch blowpipe for uniformly heating said spliced portion.

6. A method for fabricating an optical fiber coupler comprising:

preparing an optical fiber strand having at least two segments of optical fibers, and a quartz tube having a length smaller than that of said fiber strand;

removing coatings on two ends of each of said optical fibbers;

removing coatings on central portions of said optical fibers to be fused;

securing one end of said fiber strand to a first pulling stage and passing said fiber strand through said quartz tube;

splicing said central portions to be fused to form a spliced portion;

securing the other end of said fiber strand to a second pulling stage and clipping said quartz tube on a holding device;

providing a heating device having at least one torch blowpipe capable of indirectly heating said spliced portion through said quartz tube;

coupling an optical source to said one end and connecting said the other end to an optical detector;

igniting said torch blowpipe, reciprocatingly moving said torch blowpipe along said quartz tube, and moving said first and second pulling stages in a mirror-image symmetrical manner for oppositely pulling said fiber strand at its two ends while said quartz tube remains stationary;

interrupting heating of said at least one torch blowpipe when a desired output ratio of said optical fibers is detected by said detector; and filling an adhesive through two ends of said quartz tube for adhesively incorporate said fiber strand with said quartz tube.

7. A method according to claim 6 further comprising providing a programmable controller for programmably controlling how said first and second pulling stages are moved, how said at least one torch blowpipe is reciprocatingly moved and how high the temperature of said at least one torch blowpipe is.

* * * * *